(12) United States Patent
Lee et al.

(10) Patent No.: US 7,945,234 B2
(45) Date of Patent: May 17, 2011

(54) LOW DUTY CYCLE HALF-DUPLEX MODE OPERATION WITH COMMUNICATION DEVICE

(75) Inventors: Chong U. Lee, San Diego, CA (US); Alejandro R. Holcman, San Diego, CA (US); Arik Mimran, Haifa (IL); Jack Keil Wolf, La Jolla, CA (US); Leonid Sheynblat, Hillsborough, CA (US); Roberto Padovani, San Diego, CA (US); Paul E. Bender, San Diego, CA (US); Ramin Rezaiifar, San Diego, CA (US); Samir K. Khazaka, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1170 days.

(21) Appl. No.: 11/357,146

(22) Filed: Feb. 16, 2006

(65) Prior Publication Data

US 2006/0280198 A1 Dec. 14, 2006

Related U.S. Application Data

(60) Provisional application No. 60/653,798, filed on Feb. 16, 2005, provisional application No. 60/708,671, filed on Aug. 15, 2005.

(51) Int. Cl.
*H04B 1/16* (2006.01)
(52) U.S. Cl. ............. 455/343.2; 455/41.2; 455/517; 455/412.1; 455/466; 370/296

(58) Field of Classification Search ......... 455/343.2, 455/343.3, 343.4, 343.5, 41.2, 517, 518, 455/522, 412.1, 412.2, 466; 370/296, 335, 370/338, 225
See application file for complete search history.

(56) References Cited

U.S. PATENT DOCUMENTS

| 5,276,703 | A | * | 1/1994 | Budin et al. ............. 375/130 |
| 5,748,104 | A | * | 5/1998 | Argyroudis et al. ..... 340/870.11 |
| 6,154,500 | A | | 11/2000 | Dorenbosch et al. |
| 6,449,491 | B1 | * | 9/2002 | Dailey ..................... 455/518 |
| 6,490,446 | B1 | * | 12/2002 | Haartsen .................. 455/422.1 |
| 7,027,425 | B1 | * | 4/2006 | Fullerton et al. ............ 370/338 |
| 7,047,051 | B2 | * | 5/2006 | Sackett et al. .............. 455/574 |

(Continued)

FOREIGN PATENT DOCUMENTS

EP 1158685 A1 11/2001

(Continued)

OTHER PUBLICATIONS

International Search Report-PCT/US2006/005785, International Search Authority/EPO, Jun. 29, 2006 (2 pages).

(Continued)

*Primary Examiner* — Matthew D Anderson
*Assistant Examiner* — Shaima Q Aminzay
(74) *Attorney, Agent, or Firm* — Donald C. Kordich; Arnold J. Gum (57) ABSTRACT

Operating a communication device in a half-duplex mode using only overhead channels; and substantially free running a timing reference obtained during reception to allow a timing reference value to drift during transmission.

34 Claims, 8 Drawing Sheets

U.S. PATENT DOCUMENTS

| | | |
|---|---|---|
| 7,301,477 B2 | 11/2007 | Isoyama et al. |
| 7,386,299 B2 | 6/2008 | Nakamura |
| 7,394,782 B2 | 7/2008 | Davis |
| 7,412,265 B2 | 8/2008 | Chen et al. |
| 7,457,973 B2 | 11/2008 | Liu |
| 7,466,665 B2 * | 12/2008 | Calcev et al. ............ 370/255 |
| 7,508,781 B2 | 3/2009 | Liu et al. |
| 2004/0024879 A1 | 2/2004 | Dingman et al. |
| 2005/0055418 A1 | 3/2005 | Blanc et al. |
| 2005/0190723 A1 * | 9/2005 | Rao et al. ............ 370/329 |
| 2006/0068750 A1 | 3/2006 | Burr |
| 2006/0111825 A1 | 5/2006 | Okada et al. |
| 2006/0280140 A9 | 12/2006 | Mahany et al. |
| 2007/0150599 A1 | 6/2007 | Neogi et al. |

FOREIGN PATENT DOCUMENTS

| | | |
|---|---|---|
| JP | 1286528 | 11/1989 |
| JP | 1175261 | 3/1999 |
| RU | 2181229 C1 | 4/2002 |
| WO | WO9619084 A1 | 11/1996 |
| WO | WO97018639 | 5/1997 |
| WO | WO9927465 | 6/1999 |
| WO | 02/080483 A1 | 10/2002 |

OTHER PUBLICATIONS

Written Opinion—PCT/US2006/005785, International Search Authority, European Patent Office, Jun. 29, 2006.

* cited by examiner

LOW DUTY CYCLE HALF-DUPLEX MODE OPERATION WITH COMMUNICATION DEVICE

CROSS-REFERENCE TO RELATED APPLICATIONS

This application claims the benefit of priority of U.S. Provisional Patent Application Ser. No. 60/653,798 entitled "Low Duty Cycle CDMA Device", filed Feb. 16, 2005. This application also claims the benefit of priority of U.S. Provisional Patent Application Ser. No. 60/708,671 entitled "Low Duty Cycle Half-Duplex Mode Operation with Telecommunication Device", filed Aug. 15, 2005. Benefits of priority of the filing dates of Feb. 16, 2005 and Aug. 15, 2005 are hereby claimed, and the disclosures of the Provisional Patent Applications are hereby incorporated by reference.

BACKGROUND

1. Field

The present invention generally relates to transmission of data over telecommunication networks, and to telecommunication devices that enable such transmission. More particularly, the invention concerns a new technique for using the telecommunication device in a half-duplex mode for a low duty cycle data transmission operation.

2. Background

Remote monitoring of operations may involve battery-operated, wireless telecommunication devices that monitor operational status information and transmit via radio frequency signals the operational status information to a remotely situated information-processing device. Oftentimes, the operational status information can be transmitted via radio frequency signals as short messages. In such monitoring and transmission configurations, issues associated with power consumption management are an important concern.

In a typical operational environment, low maintenance battery-operated monitoring/telecommunication devices are desirable to facilitate operating efficiency and to reduce maintenance costs. Therefore, it is desirable to have a monitoring/telecommunication device that can operate for an extended period of time without requiring frequent maintenance for battery replacement and the like. For example, the telecommunication device may be placed in a sleep or low-power operating mode when there is no ongoing communication with the information-processing device. A trade off is usually made between the availability of the telecommunication device for communications with the information processing device and the amount of power consumption savings that can be achieved. A telecommunication device employing a power consumption saving technique may not be able to communicate with the remotely situated information-processing device as its communication circuitry or sections thereof may be shut-off when the device is in the sleep mode in order to conserve battery power.

There is therefore a need in the art for low power means of transmitting operational status information via radio frequency signals.

SUMMARY

In one aspect, a method of operating a communication device is disclosed. The method includes operating a communication device in a half-duplex mode using only overhead channels; and substantially free running a timing reference obtained during reception to allow a timing reference value to drift during transmission.

In another aspect, a communication device is disclosed. The communication device comprising: a receive chain and a transmit chain operating in a half-duplex mode to receive and transmit low duty cycle (LDC) messages using only overhead channels; and a half-duplex controller coupled to the receive chain and the transmit chain to substantially free run a timing reference obtained during reception to allow a timing reference value to drift during transmission.

In another aspect, a tangible storage medium including a computer program for operating a communication device in a half-duplex mode using only overhead channels is disclosed. The program comprises executable instructions that cause a computer to: substantially free run a timing reference obtained during reception to allow a timing reference value to drift during transmission; and substantially freeze a power estimate obtained during the reception for use as a transmit power value during the transmission.

DETAILED DESCRIPTION

The nature, objectives, and advantages of the present invention will become more apparent to those skilled in the art after considering the following detailed description in connection with the accompanying drawings.

Introduction

In recognition of the above-stated problems associated with remote monitoring of operational status information and transmitting via radio frequency signals, the present disclosure describes several embodiments for using only overhead channels of a telecommunication network (e.g., a cellular network such as a CDMA or GSM network) in a half-duplex mode. In particular, the operational status information is transmitted from a communication device to a remotely situated information-processing device as low duty cycle (LDC) messages in a half-duplex mode.

In one implementation, the communication device is a wireless telecommunication device including a CDMA communication device, and the remotely situated information-processing device is a processor located within or coupled to the CDMA network, such as a base station controller or other network controllers. In another implementation, the remotely situated information-processing device includes another communication device implemented in a peer-to-peer communication configuration.

In one implementation, the overhead channels used in CDMA 2000 1x (First Evolution) include pilot, sync, and paging channels in the forward link and an access channel in the reverse link. The overhead channels used in CDMA 2000 1x EV-DO (First Evolution-Data Only) include pilot, sync, and control channels in the forward link and an access channel in the reverse link. In other implementations, the overhead channels include any non-traffic channels that provide reference, timing, system configuration, and access. In a CDMA application, traffic channels carry main information such as two-way voice signals for providing telephone conversation.

The term "half-duplex mode" refers to a mode of the communication device that, for any given transmission period, is permitted to act as one of a transmitter or receiver, but the device cannot both transmit and receive in the same communication period.

The term "low duty cycle messages" refers to messages transmitted intermittently or occasionally.

The term "hibernate mode" refers to a mode of the communication device that places the communication device in a state of sleep and turns off all units in the communication device except for a timing device to keep track of the duration of the sleep. For low duty cycle applications, the duration of the sleep is often substantially longer than allowable under the protocol of a conventional wireless communication network.

Communication Device

Figure 1:
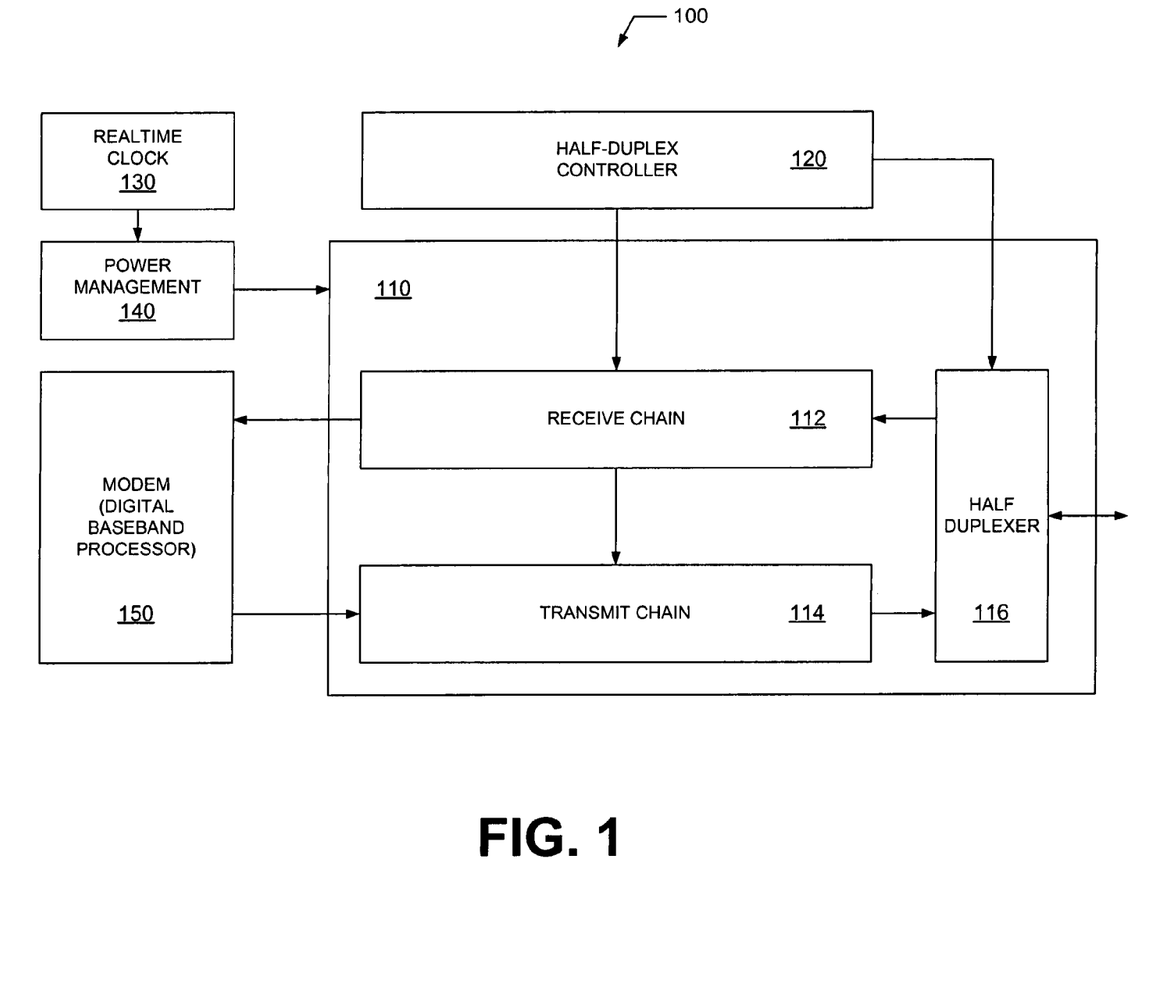
FIG. 1 illustrates a block diagram of one implementation of a communication device such as a CDMA communication device.

FIG. 1 illustrates a block diagram of one implementation of a communication device 100, such as a CDMA communication device. The communication device 100 includes a half-duplex transceiver 110, a half-duplex controller 120, a real-time clock (RTC) 130, a power management unit 140, and a modem (e.g., a digital baseband processor) 150. The half-duplex transceiver 110 includes a receive chain 112, a transmit chain 114, and a half duplexer 116. Thus, units 110 and 150 in the communication device 100 are configured to enable communication over an existing communication network such as a CDMA network. In one implementation, the communication device is a fixed device. In another implementation, the communication device is a mobile device.

In the illustrated implementation of FIG. 1, the half-duplex transceiver 110 operates in a half-duplex mode where the half duplexer 116 switches between a receive mode and a transmit mode. In one implementation, the half duplexer 116 is implemented with an RF switch. In another implementation, the half duplexer 116 is integrated into the receive chain 112 and the transmit chain 114 so that the switching between the modes is performed by the receive chain 112 and the transmit chain 114. When the half-duplex transceiver 110 is operating in the receive mode, the half-duplexer 116 selects the received forward link signal and routes the signal to the baseband processor 150 through the receive chain 112. Alternatively, when the half-duplex transceiver 110 is operating in the transmit mode, the half duplexer 116 receives the reverse link signal output from the baseband processor 150 through the transmit chain 114 and routes the reverse link signal to an antenna for transmission.

In one implementation, the decision to switch to the transit mode is made by the communication device 100 in an asynchronous manner rather than in a synchronous manner where the receive mode to transmit mode switching is periodic and predictable. This asynchronous switching is either triggered by an event within the communication device 100 or in coordination with a network entity based on exchanged messages. The switching instances need not be locked to the basestation or network system timing.

In the illustrated implementation of FIG. 1, the simple half duplexer 116 such as a receive/transmit RF switch replaces an RF front end of a conventional communication device including an expensive and lossy duplexer. Since the communication device 100 is operating in a half-duplex mode, certain RF blocks can be time shared between the receive chain 112 and the transmit chain 116. Therefore, operating the communication device in a half-duplex mode allows the receive chain 112 and the transmit chain 114 to be implemented on a same silicon substrate without any interference.

The half-duplex controller 120 is configured to control the mode of the half-duplex transceiver 110. For example, when the transceiver 110 is to be operated in a receive mode, the half-duplex controller 120 enables the receive chain 112 to synchronize the communication device 100 with a network timing and to compute an open loop power estimate. When the transceiver 110 is to be operated in a transmit mode, the half-duplex controller 120 freezes the timing reference along with a frequency tracking loop (i.e., the tracking of a finger), and switches off the receive chain 112. The half-duplex controller 120 then switches on the transmit chain 114 and enables the transmit chain 114 to transmit an access probe message at the open loop power estimate last computed by the receive chain 112. Once the transceiver 110 is ready to be operated in a receive mode again, the half-duplex controller 120 switches the receive chain 112 on and closes the control loop for the timing reference. The transceiver 110 then listens for LDC messages on overhead channels of a telecommunication network.

To enter a hibernate mode, the power management unit 140 is configured to manage the power consumption of the communication device 100 by turning off all units within the communication device 100 except for the power management unit 140 and the realtime clock (RTC) 130. When the communication device 100 receives a command from a network controller to enter into a hibernate mode for a particular duration, the received command is sent to the power management unit 140, which turns off power to all units except for the power management unit 140 and the RTC 130. While the communication device 100 is in the hibernate mode, the power management unit 140 keeps track of the particular duration using the RTC 130.

Figure 2:
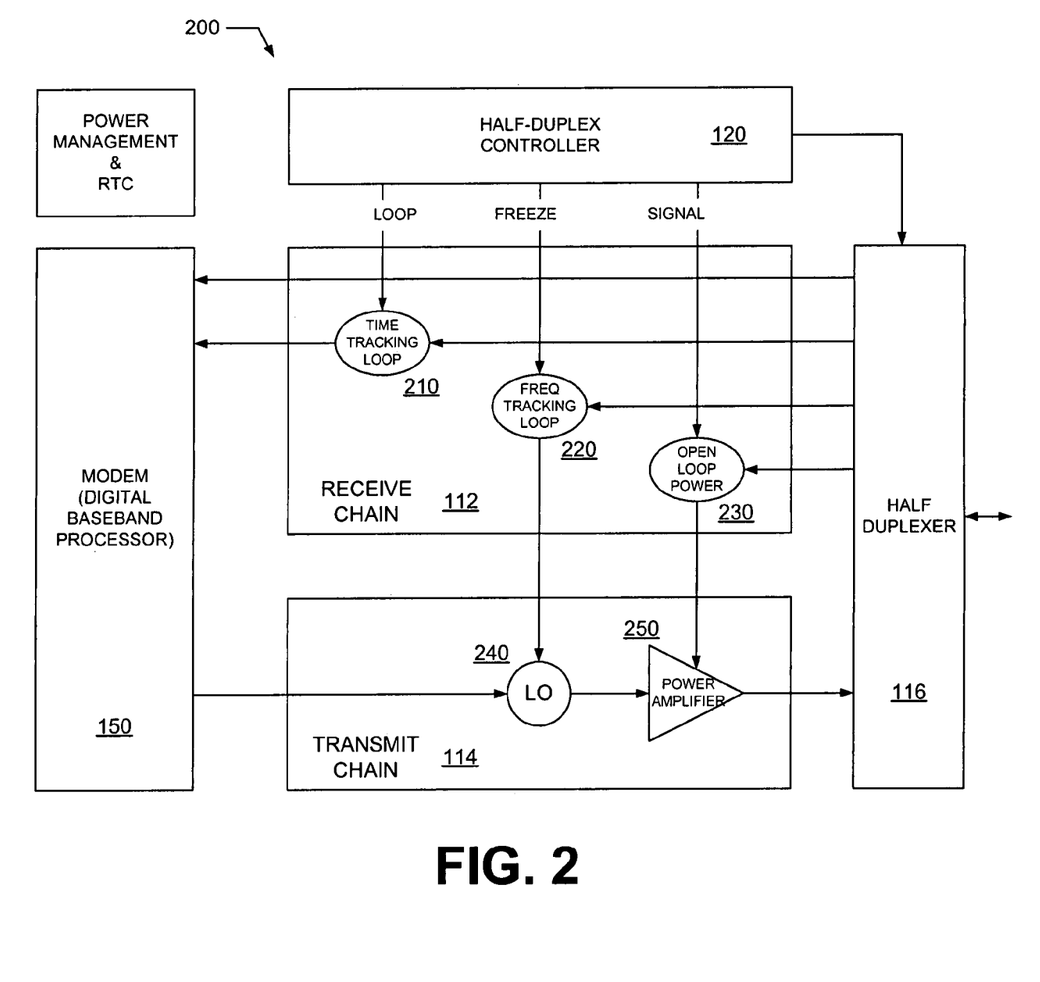
FIG. 2 illustrates a block diagram of another implementation of a communication device showing a detailed configuration of tracking loops.

FIG. 2 illustrates a block diagram of another implementation of a communication device 200 showing a detailed configuration of tracking loops. During a receive mode of the communication device 200, tracking loops 210, 220, 230 of the receive chain 112 is active to synchronize the communication device 200 with a network timing and to compute an open loop power estimate. However, when the communication device 200 is to be operated in a transmit mode, the half-duplex controller 120 freezes the timing reference 210, the frequency tracking loop 220, and the last-computed open loop power estimate 230. In a normal full duplex mode, the frequency tracking loop enables the communication device to stay locked in frequency and is used to adjust the local oscillator of the transmit chain to remove any residual frequency error of the digital receivers.

Once the tracking loops are frozen, the half-duplex controller 120 switches off the receive chain 112 and switches on the transmit chain 114. Since the frequency tracking loop 220 is frozen, the local oscillator 240 of the transmit chain 114 is allowed to drift. However, as described below, since the duration of the transmit mode is relatively short for low duty cycle applications, the drift of the local oscillator does not adversely affect the integrity of the transmitted signal. Further, since the open loop power estimate control loop 230 is frozen, the power amplifier 250 of the transmit chain 114 is set to transmit at the last computed open loop power estimate for the entire duration of the transmit mode. Again, since the duration of the transmit mode is relatively short, using the same transmit power for the entire transmit mode does not adversely affect the integrity of the transmitted signal, especially for those LDC application where the communication device 200 is fixed. In an alternative implementation, the timing reference and the power estimate may be integrated over time rather than letting the timing reference drift and maintaining the same power level (as the last power estimate calculated in receive mode) during the transmit mode.

Figure 3:
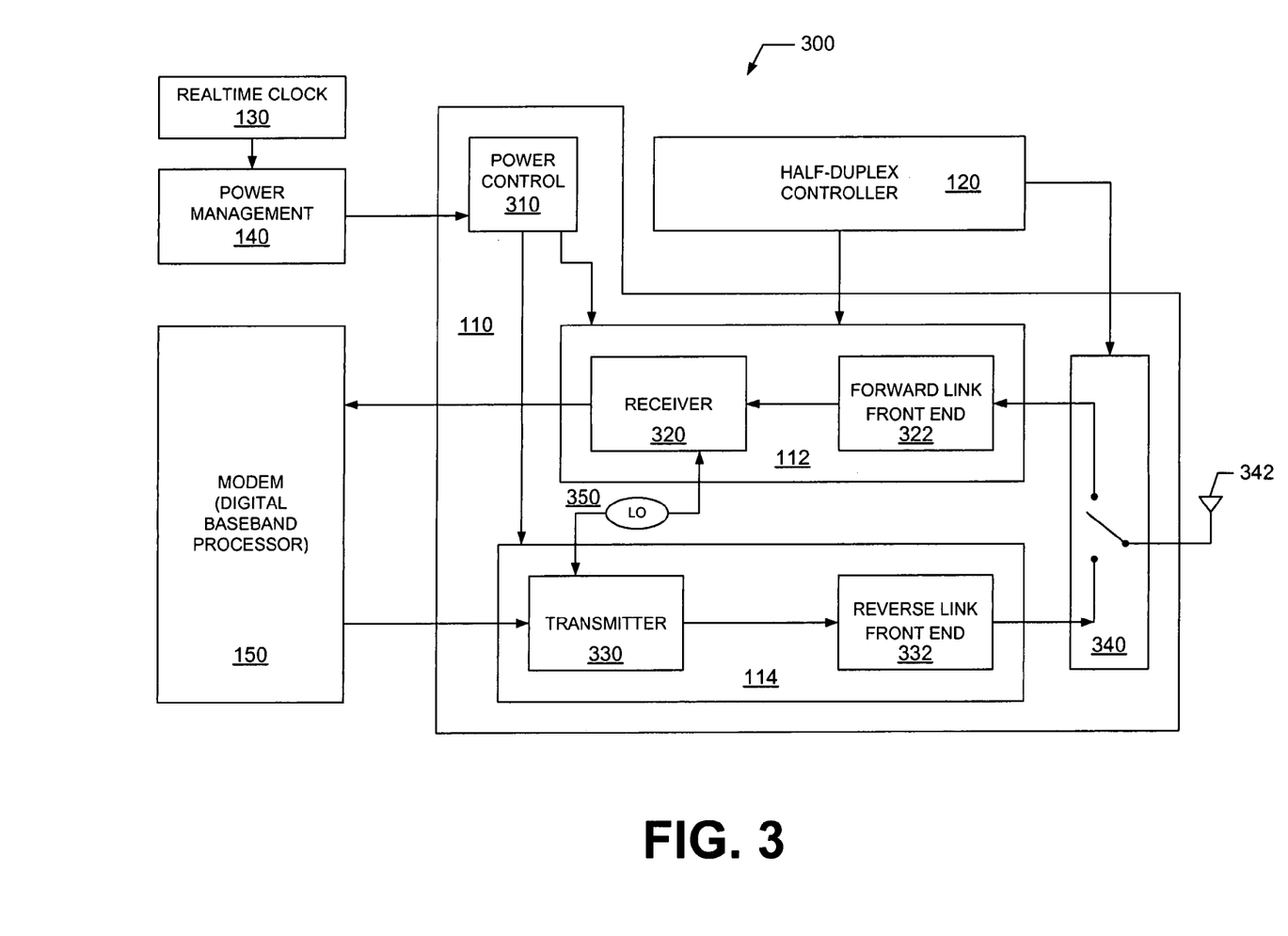
FIG. 3 illustrates a block diagram of another implementation of a communication device showing detailed configurations of the power management and the half-duplexer.

FIG. 3 illustrates a block diagram of another implementation of a communication device 300 showing detailed configurations of the power management and the half-duplexer.

When the communication device 300 is to be operated in a half-duplex mode, the power management unit 140 directs the power control unit 310 to operate the receive chain 112 and the transmit chain 114 in the half-duplex mode. Therefore, when the transceiver 110 is to be operated in a receive mode, the power control unit 310 turns on power to the receive chain 112 and turns off power to the transmit chain 114. Alternatively, when the transceiver 110 is to be operated in a transmit mode, the power control unit 310 turns on power to the transmit chain 114 and turns off power to the receive chain 112.

During the half-duplex mode, the communication device 300 can further reduces its idle state power requirements by enabling a slotted mode of operation. In a typical wireless telecommunication network such as a CDMA network, a paging channel slot is an 80-millisecond time slot within a paging slot cycle. The paging slot cycle ranges from 16 time slots (period=1.28 seconds; slot cycle index=0) to 2048 time slots (period=163.84 seconds; slot cycle index=7). Thus, in the slotted mode, the communication device 300 only monitors a selected subset of the paging channel slots for messages from a network controller.

For LDC applications, however, the time between successive transmissions of messages may be significantly longer than the maximum allowable paging slot cycle period. In this case, the network controller may command the communication device 300 into a hibernate mode, where all units except for the power management unit 140 and the RTC 130 are turned off for a predetermined period of time. In one implementation, the predetermined period of time can be one second to several years.

When the communication device 300 is to be operated in the hibernate mode, the communication device 300 receives a command from the network controller to enter into the hibernate mode for a predetermined period of time. The power management unit 140 receives and directs the power control unit 310 to turn off all units within the communication device 100 except for the power management unit 140 and the RTC 130. In the hibernate mode, the communication device 300 is placed in a state of sleep for the predetermined period of time (i.e., a sleep duration) that is often substantially longer than allowable under the protocol of a conventional wireless communication network (e.g., the slot cycle index (SCI) of a CDMA cellular network). The power management unit 140 keeps track of the sleep duration using the RTC 130.

The illustrated implementation of FIG. 3 also shows a half-duplexer implemented as an RF switch 340 to route signals to and from the antenna 342. During the receive mode, the RF switch 340 routes the forward link signal received at the antenna 342 to the receiver 320 through the forward link front end 322. During the transmit mode, the RF switch 340 selects the reverse link signal output from the transmitter 330 through the reverse link front end 332 and routes the reverse link signal to the antenna 342 for transmission.

Figure 4:
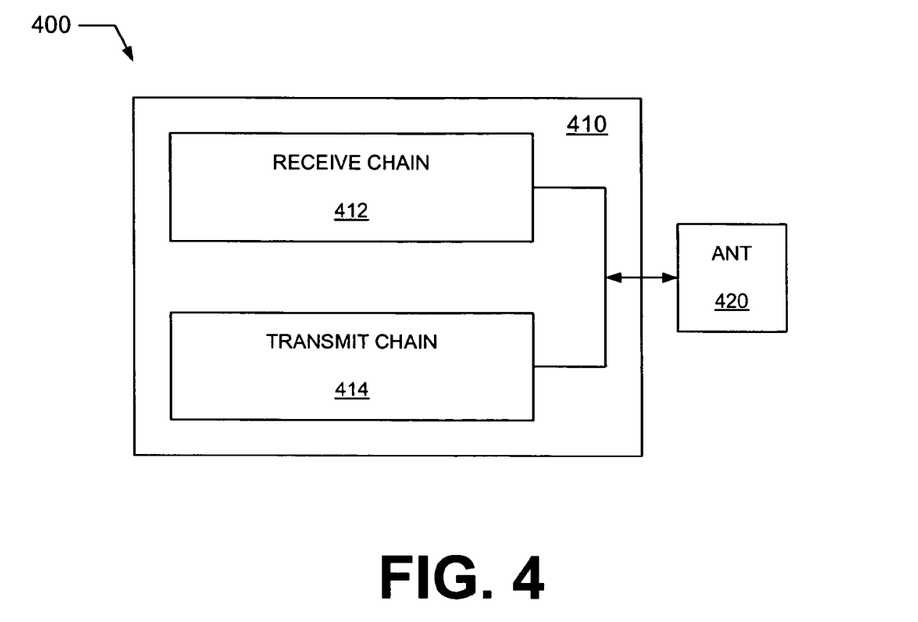
FIG. 4 illustrates one alternative implementation of the half duplexer integrated into the receive chain and the transmit chain so that the half-duplex operation is performed within the receive chain and the transmit chain with forward link and reverse link signals time sharing one antenna.
Figure 5:
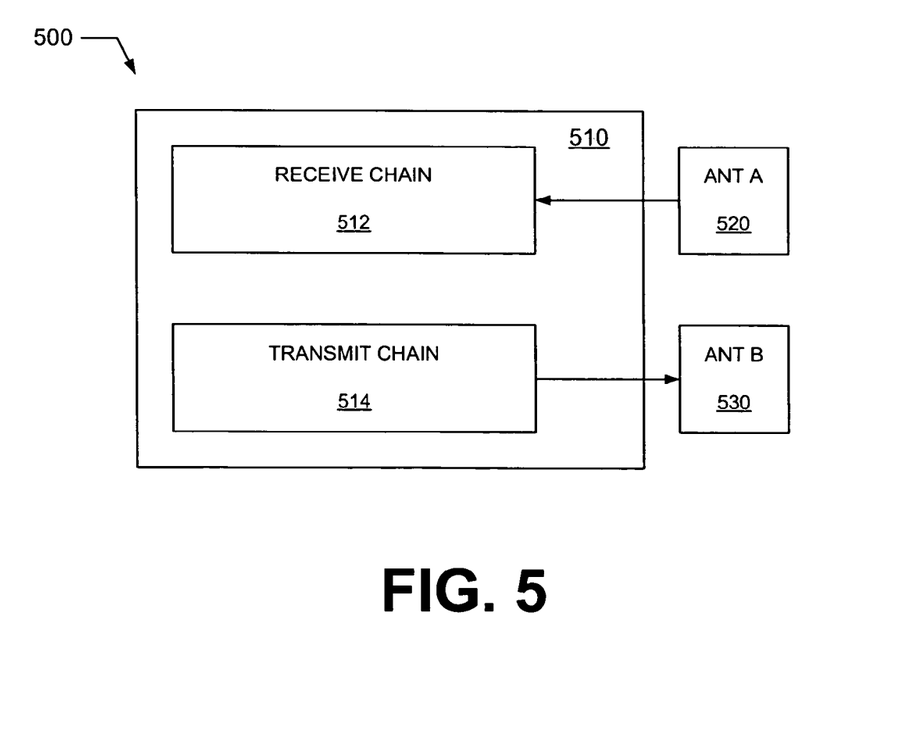
FIG. 5 illustrates another alternative implementation of the half duplexer integrated into the receive chain and the transmit chain but with the forward link signal being received at antenna A and the reverse link signal being transmitted antenna B.

FIG. 4 and FIG. 5 illustrate two alternative implementations of the half duplexer 116. FIG. 4 illustrates one alternative implementation 400 of the half duplexer integrated into the receive chain 412 and the transmit chain 414 so that the half-duplex operation is performed within the receive chain 412 and the transmit chain 414 with forward link and reverse link signals time sharing one antenna 420. FIG. 5 illustrates another alternative implementation 500 of the half duplexer integrated into the receive chain 512 and the transmit chain 514 but with the forward link signal being received at antenna A 520 and the reverse link signal being transmitted antenna B 530.

Low Duty Cycle Operation in a Half-Duplex Mode

Having described various structural features, some operational aspects of the present disclosure are now described.

Figure 6:
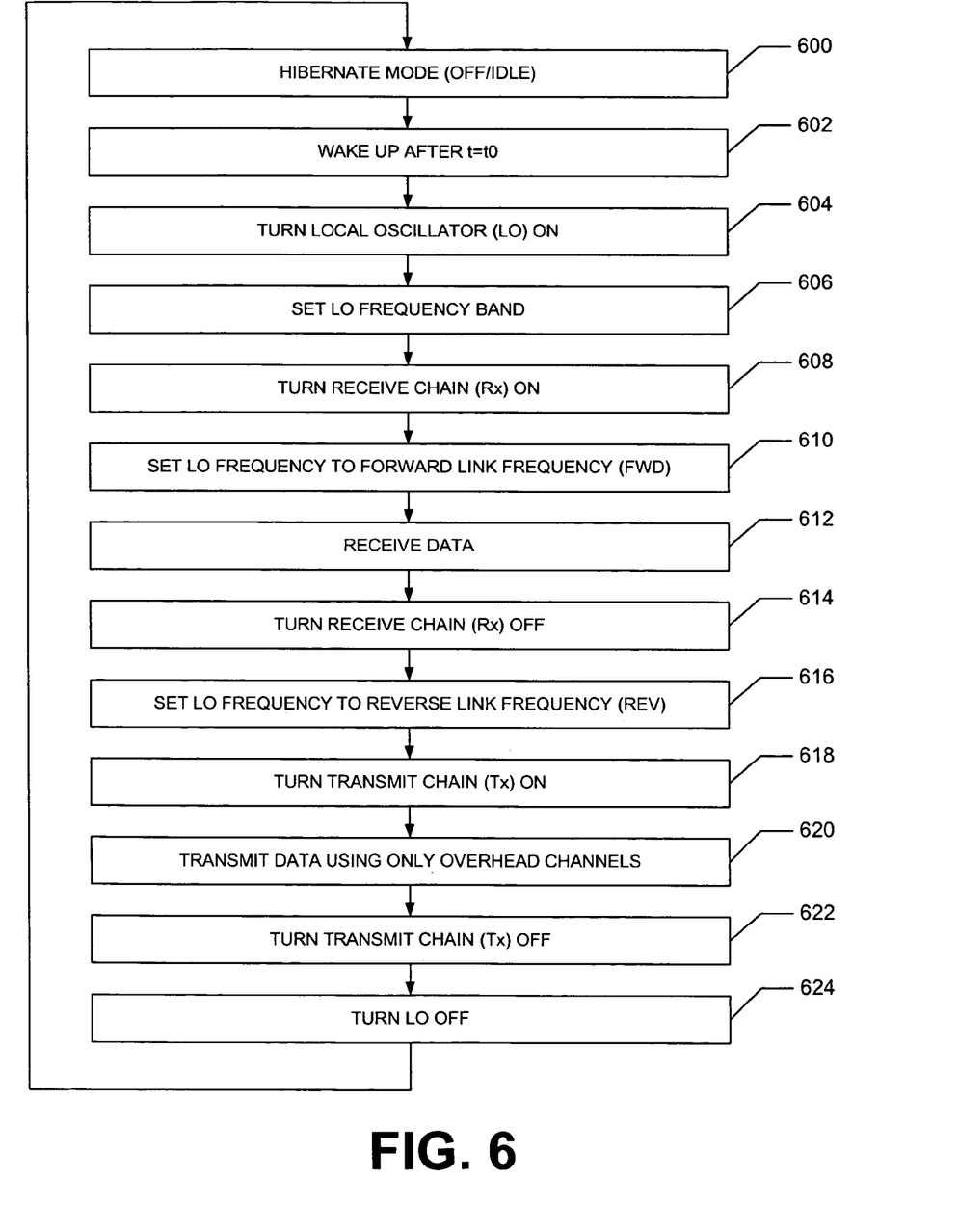
FIG. 6 is a flowchart illustrating a method for transmitting and receiving low duty cycle (LDC) messages in a half-duplex mode in accordance with one implementation of the present invention.

FIG. 6 is a flowchart illustrating a method for transmitting and receiving low duty cycle (LDC) messages in a half-duplex mode in accordance with one implementation of the present invention. The method involves monitoring and transmitting the LDC messages from the communication device 100 to a remotely situated information-processing device in a half-duplex mode using only overhead channels of a telecommunication network. In one example, the telecommunication network is a CDMA network.

In the illustrated implementation of FIG. 6, when a network controller determines that the communication device 100 should be placed into a sleep state, the device 100 is transitioned into a hibernate mode, at 600, for a particular duration as set by the network controller. As described above, the particular duration of the hibernate mode is often substantially longer than allowable under the protocol of a conventional wireless communication network such as a CDMA network. Once the communication device 100 has been in the hibernate mode for the particular duration, the power management unit 140 of the communication device 100 transitions the device 100 into an ON state of the half-duplex mode, at 602. In some implementations, the communication device 100 can be awakened from the hibernate mode when a priority wake up message is received even though the particular duration of the hibernate mode has not elapsed since last power down.

The local oscillator (LO) 350 is turned on, at 604, and the LO frequency band is set, at 606. The receive chain 112 is then turned on, at 608; the LO frequency is set to the forward link frequency, at 610; and the receive chain 112 receives forward link messages, at 612. In one implementation, the received forward link messages include instructions, control information, and/or software downloads for managing the operational state of the communication device 100. Once the data reception process has been completed, the receive chain is turned off, at 614. In some implementations, the receive chain 112 includes a power supply and other related units (not shown).

The LO frequency is then set to a reverse link frequency, at 616, and the transmit chain 114 is turned on, at 618. At 620, the transmit chain 114 transmits LDC messages using only overhead channels of a telecommunication network. In one implementation, the LDC messages include operational status information including the state, condition, and/or location of the communication device 100.

For CDMA 2000 1x, the transmission of LDC messages using only the overhead channels can be implemented as short data burst (SDB) and/or short message service (SMS) over data burst messaging (DBM). For CDMA 2000 1x EVDO, the transmission of LDC messages using only the overhead channels can be implemented as Data over Signaling (DoS).

Figure 7:
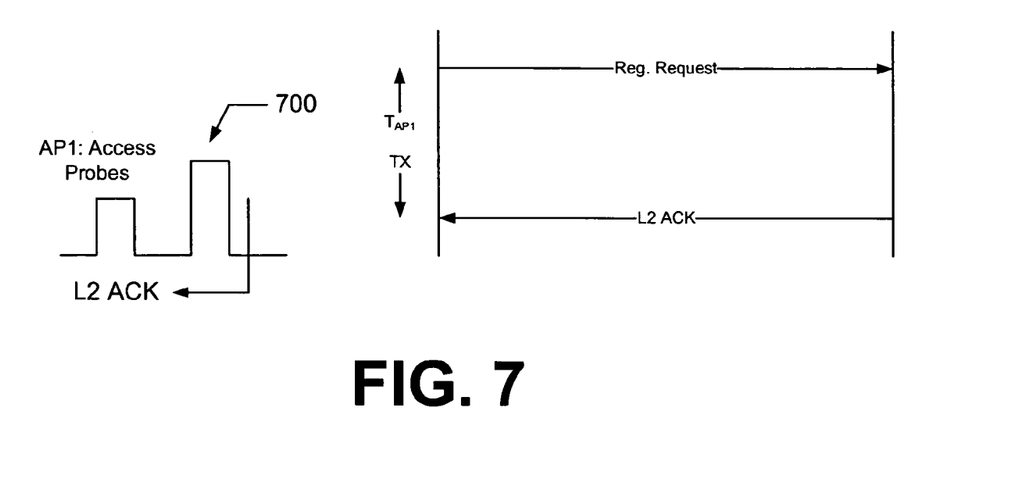
FIG. 7 shows a registration model in which the communication device transmits an access probe signal, including the LDC messages, during the transmit mode.
Figure 8:
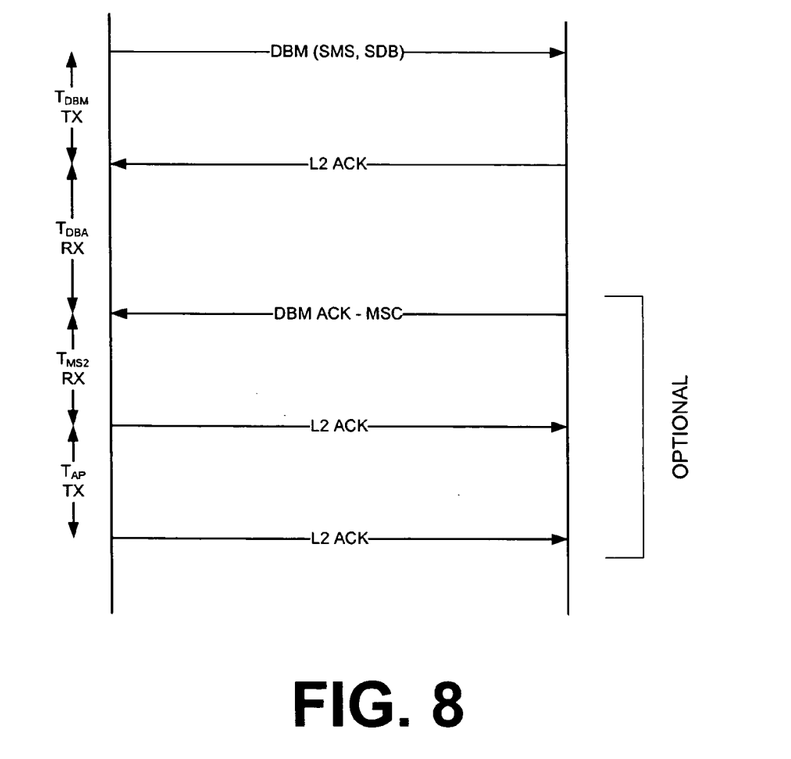
FIG. 8 shows a model in which the communication device transmits an LDC message over the access probe signal.
Figure 9:
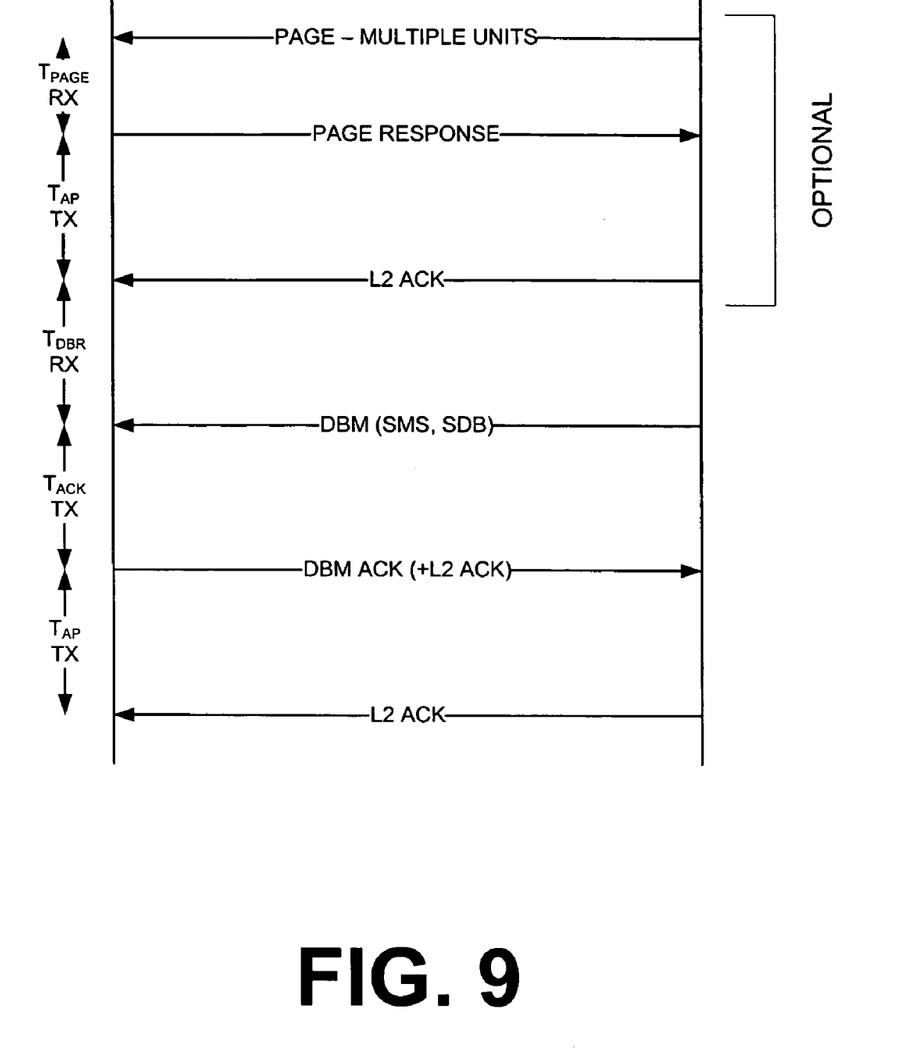
FIG. 9 shows a model in which the communication device determines whether the device is being paged by the base station.

FIG. 7 through FIG. 9 illustrate signal protocols between the communication device 100 and the network using overhead channels.

FIG. 7 shows a registration model in which the communication device 100 transmits an access probe signal, including the LDC messages, during the transmit mode. If there is no acknowledgement from a base station within a predetermined period of time ($T_{AP1}$), the access probe signal is retransmitted with increased power 700. Once the direct command acknowledgement (L2 ACK) is received from the base station, the access probe signal transmission is terminated.

FIG. 8 shows a model in which the communication device 100 transmits an LDC message over the access probe signal. The access probe signal is retransmitted until the direct command acknowledgement (L2 ACK) is received from the base station. The base station then reports that the network successfully received the transmitted message, to which the communication device acknowledges the data acceptance by the base station. Finally, the base station terminates the transmission of the access probe signal once the acknowledgement is received by the base station.

FIG. 9 shows a model in which the communication device 100 determines whether the device is being paged by the base station. If it is determined that the communication device 100 is being paged by the base station, the communication device acknowledges the paging using access probe signal until the transmission of the access probe signal is terminated by the base station. The base station sends the data using Data Burst Message (DBM). The communication device 100 then acknowledges the transmission from the base station using access probe signal until the transmission is terminated by the base station.

Referring back to FIG. 6, once the message transmission process has been completed, the transmit chain 114 is turned off, at 622. The local oscillator (LO) is then turned off, at 624, and the process repeats by transitioning the communication device 100 into the hibernate mode again.

Other Embodiments

Figure 10:
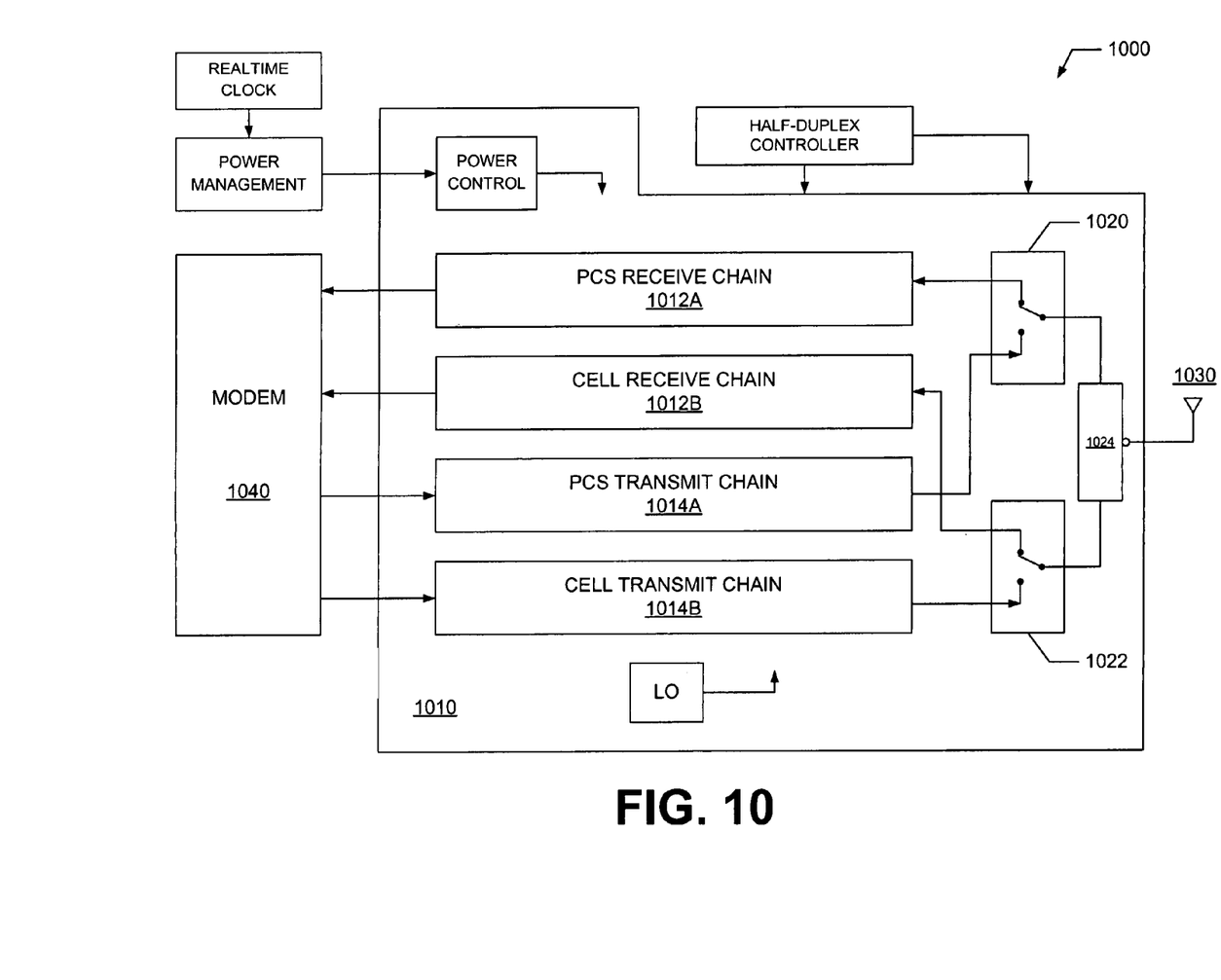
FIG. 10 illustrates a block diagram of another implementation of a communication device, which is implemented with a dual band half-duplex transceiver.

FIG. 10 illustrates a block diagram of another implementation of a communication device 1000, which is implemented with a dual band half-duplex transceiver 1010. The communication device 1000 includes two separate transmit and receive chains to enable operation of the transceiver 1010 over two different cellular bands. In the illustrated implementation, the dual bands are represented as an 800 MHz cellular band and a 1900 MHz PCS band. However, the dual bands can be represented as any frequency bands. The diplexer 1024 splits the antenna input into two cellular bands.

The PCS band is implemented with a PCS receive chain 1012A and a PCS transmit chain 1014A. The cellular band is implemented a cell receive chain 1012B and a cell transmit chain 1014B. An RF switch 1020 selects between forward and reverse link channels of the PCS band, while an RF switch 1022 selects between forward and reverse link channels of the cellular band.

Applications

Implementations of the LDC half-duplex operation described above can be used in many different applications including asset tracking, automated meter reading, cashless payment of parking meters, traffic lights and sensors, billboards and public displays, real-time health monitoring, home/office security and alarm systems, automotive telematics, utility distribution grid monitoring, position monitoring using GPS, and other related polling applications. Message transmission for these applications can range from an average of one short messaging service (SMS) message per hour for an asset tracking application to one SMS message per month for an automated meter reading application.

Those of skill in the art understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

Moreover, the previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of operating a communication device comprising:
   communicating only on overhead channels;
   communicating only in a half-duplex mode, wherein the communication device does not simultaneously send and receive messages; and
   free running a timing reference, comprising a time tracking loop, obtained during reception to allow a timing reference value to drift during transmission.
2. The method of claim 1, further comprising:
   computing a power estimate obtained during said reception for use as a transmit power value during said transmission.
3. The method of claim 2, wherein said computing a power estimate obtained during said reception includes:
   using a last computed open loop power estimate obtained during said reception to set an output value for a power amplifier during said transmission.
4. The method of claim 3, further comprising:
   transmitting an access probe signal at said last computed open loop power estimate obtained during said reception.
5. The method of claim 1, further comprising:
   receiving low duty cycle (LDC) messages during a receive mode; and
   transmitting LDC messages during a transmit mode.
6. The method of claim 1, further comprising:
   operating a CDMA device over a CDMA network.
7. The method of claim 1, further comprising:
   receiving a command to turn off power to said communication device for a predetermined period of time.
8. The method of claim 7, further comprising:
   turning off power to said communication device for said predetermined period of time to be monitored by a timing unit coupled to said communication device.
9. The method of claim 8, further comprising:
   powering up said communication device when said timing unit determines that said predetermined period of time has elapsed since last power down of said communication device.
10. The method of claim 8, further comprising:
    powering up said communication device when a priority wake up message is received even though said predetermined period of time has not elapsed since last power down of said communication device.
11. The method of claim 1, wherein said timing reference includes a local oscillator.
12. The method of claim 1, further comprising:
    free running a frequency tracking loop during said transmission.
13. The method of claim 1, further comprising:
    transmitting LDC messages as short data burst (SDB) messages over data burst messaging (DBM).
14. The method of claim 1, further comprising:
    transmitting LDC messages as short message service (SMS) messages over data burst messaging (DBM).
15. The method of claim 1, further comprising:
    transmitting LDC messages as Data over Signaling (DoS).
16. The method of claim 1, further comprising:
    transmitting an access probe signal including LDC messages.
17. The method of claim 16, further comprising:
    retransmitting said access probe signal with increased power when no terminating acknowledgement is received within a predefined period of time; and
    terminating transmission of said access probe signal when a terminating acknowledgement is received.
18. A communication device comprising:
    a receive chain and a transmit chain configured to:
    communicate only on overhead channels;
    communicate only in a half-duplex mode, wherein the communication device does not simultaneously send and receive messages; and
    receive and transmit low duty cycle (LDC) messages; and
    a half-duplex controller coupled to the receive chain and the transmit chain to free run a timing reference, comprising a time tracking loop, obtained during reception to allow a timing reference value to drift during transmission.
19. The device of claim 18, wherein said transmit chain:
    is further configured to transmit using a power estimate obtained during said reception.
20. The device of claim 19, further comprising:
    a power-amp adjusting unit configured to use a last computed open loop power estimate obtained during said reception to set an output value for a power amplifier during said transmission.
21. The device of claim 20, wherein said transmit chain is configured to further transmit:
    an access probe signal at said last computed open loop power estimate obtained during said reception.
22. The device of claim 18, wherein said communication device is:
    a CDMA device configured to operate over a CDMA network.
23. The device of claim 18, further comprising:
    a power management unit to power down said communication device for a predetermined period of time and power up when said predetermined period of time has elapsed.
24. The device of claim 23, further comprising:
    a timing unit coupled to said power management unit to monitor said predetermined period of time,
    wherein said communication device is configured to power up when said timing unit determines that said predetermined period of time has elapsed since last power down of said communication device.
25. The device of claim 23, wherein said power management unit comprises:
    a processor configured to power up said communication device when a priority wake up message is received, even though said predetermined period of time has not elapsed since last power down.

26. The device of claim 18, wherein said timing reference includes a local oscillator.

27. The device of claim 18, wherein said transmit chain is configured to output:
a first signal to transmit said LDC messages as short data burst (SDB) messages over data burst messaging (DBM).

28. The device of claim 18, wherein said transmit chain is configured to output:
a second signal to transmit said LDC messages as short message service (SMS) messages over data burst messaging (DBM).

29. The device of claim 18, wherein said transmit chain is configured to output:
a third signal to transmit said LDC messages as Data over Signaling (DoS).

30. A communication apparatus comprising:
means for operating the communication apparatus;
means for communicating only in a half-duplex mode, wherein:
the communication apparatus does not simultaneously send and receive messages; and
means for communicating only on overhead channels; and
means for free running a timing reference, comprising a time tracking loop, obtained during reception to allow a timing reference value to drift during transmission.

31. The apparatus of claim 30, further comprising:
means for transmitting using a power estimate obtained during said reception.

32. The apparatus of claim 30, wherein said communication apparatus is a fixed apparatus.

33. The apparatus of claim 30, wherein said communication apparatus is a mobile apparatus.

34. A non-transitory machine-readable storage medium including program code stored thereon, comprising:
program code to operate a communication device wherein the communication device:
communicates only in a half-duplex mode, wherein the communication device not simultaneously send and receive messages; and
communicates only on overhead channels; and
program code to free run a timing reference, comprising a time tracking loop, obtained during reception to allow a timing reference value to drift during transmission.

* * * * *